United States Patent
Hodge

(10) Patent No.: US 12,458,481 B2
(45) Date of Patent: Nov. 4, 2025

(54) METHOD FOR CLEANING TEETH

(71) Applicant: Linda Lorraine Hodge, Westminster, CA (US)

(72) Inventor: Linda Lorraine Hodge, Westminster, CA (US)

( * ) Notice: Subject to any disclaimer, the term of this patent is extended or adjusted under 35 U.S.C. 154(b) by 430 days.

(21) Appl. No.: 18/075,804

(22) Filed: Dec. 6, 2022

(65) Prior Publication Data
US 2024/0180681 A1  Jun. 6, 2024

(51) Int. Cl.
| | |
|---|---|
| A61C 15/02 | (2006.01) |
| A61C 15/04 | (2006.01) |
| A61C 17/20 | (2006.01) |
| A61C 17/34 | (2006.01) |

(52) U.S. Cl.
CPC .......... *A61C 17/3481* (2013.01); *A61C 15/02* (2013.01); *A61C 15/047* (2013.01); *A61C 17/20* (2013.01)

(58) Field of Classification Search
None
See application file for complete search history.

(56) References Cited

U.S. PATENT DOCUMENTS

| | | | |
|---|---|---|---|
| 4,283,174 A | 8/1981 | Sertich | |
| 5,343,883 A * | 9/1994 | Murayama | A61C 17/20 433/118 |
| 5,749,727 A | 5/1998 | Dao et al. | |
| 5,944,033 A | 8/1999 | Robinson | |
| 6,273,717 B1 | 8/2001 | Hahn et al. | |
| 6,447,293 B1 | 9/2002 | Sokol et al. | |
| 6,494,714 B1 | 12/2002 | Copeland | |
| 6,517,348 B1 * | 2/2003 | Ram | A61C 1/148 433/118 |
| 6,609,910 B2 | 8/2003 | Narayanan | |
| 8,522,797 B2 * | 9/2013 | Dickie | A61C 15/047 132/309 |
| 9,820,827 B2 | 11/2017 | Feine | |
| 10,098,708 B2 | 10/2018 | Pond | |
| 10,368,967 B2 | 8/2019 | Swatton et al. | |
| 11,173,018 B1 | 11/2021 | O'Beirne | |
| 11,607,298 B1 * | 3/2023 | Yang | A46B 15/0044 |
| 2003/0134255 A1 | 7/2003 | Masterman et al. | |

(Continued)

FOREIGN PATENT DOCUMENTS

DE    19944321 A1 *   4/2001   ............. A61C 15/00

*Primary Examiner* — Tatiana L Nobrega
(74) *Attorney, Agent, or Firm* — Eric Karich; Karich Associates

(57) ABSTRACT

A method of cleaning teeth includes the steps of providing a vibration generating handle that generates vibrations via a mounting post. An interproximal pick device is adapted to be mounted on the mounting post and includes an elongate resilient pick that is sized and shaped for cleaning between the teeth. A rigid tubular housing defines an inner conduit, with a proximal end of the elongate resilient pick being fixedly secured within the inner conduit adjacent a top end, and a resilient tube positioned within the inner conduit adjacent a bottom end. The interproximal pick device is mounted on the mounting post of the vibration generating handle such that the mounting post frictionally engages the resilient tube and transmits vibrations through the resilient tube to the elongate resilient pick.

8 Claims, 2 Drawing Sheets

(56) References Cited

U.S. PATENT DOCUMENTS

| | | | |
|---|---|---|---|
| 2005/0037316 A1* | 2/2005 | Sholder | A46B 9/028 |
| | | | 433/119 |
| 2005/0130102 A1 | 6/2005 | James Pring | |
| 2007/0254262 A1 | 11/2007 | Doussin et al. | |
| 2009/0239191 A1 | 9/2009 | Wurm et al. | |
| 2016/0135657 A1 | 5/2016 | Mao et al. | |
| 2020/0086355 A1* | 3/2020 | Phan | B08B 1/10 |
| 2022/0125563 A1 | 4/2022 | Snyder | |
| 2022/0133455 A1 | 5/2022 | Vuillet et al. | |
| 2022/0249213 A1 | 8/2022 | He et al. | |

* cited by examiner

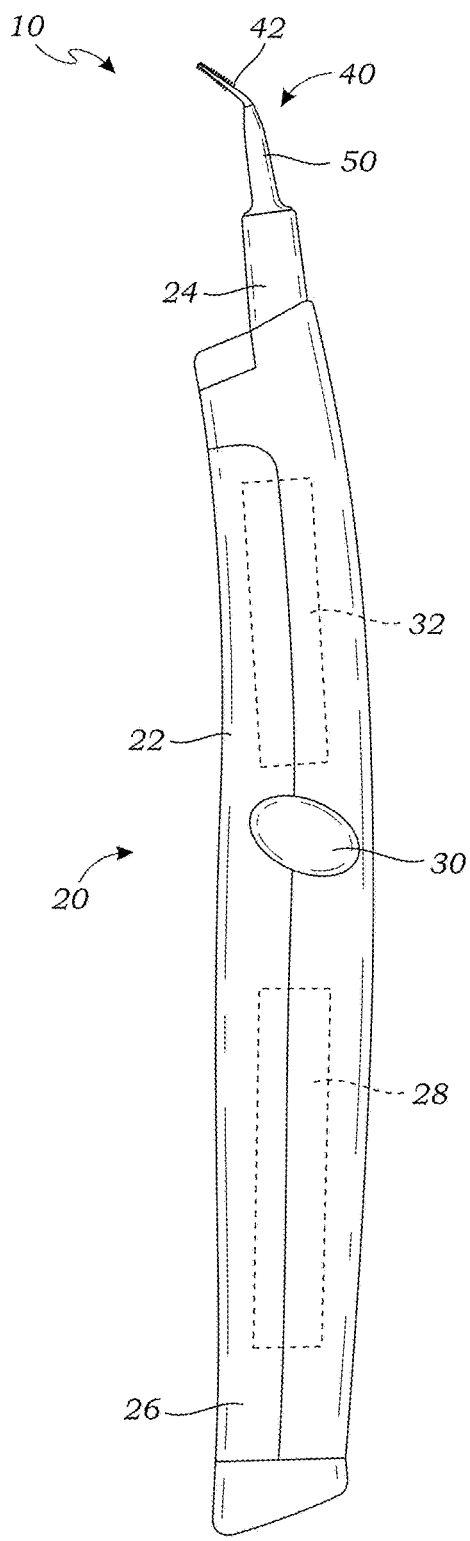
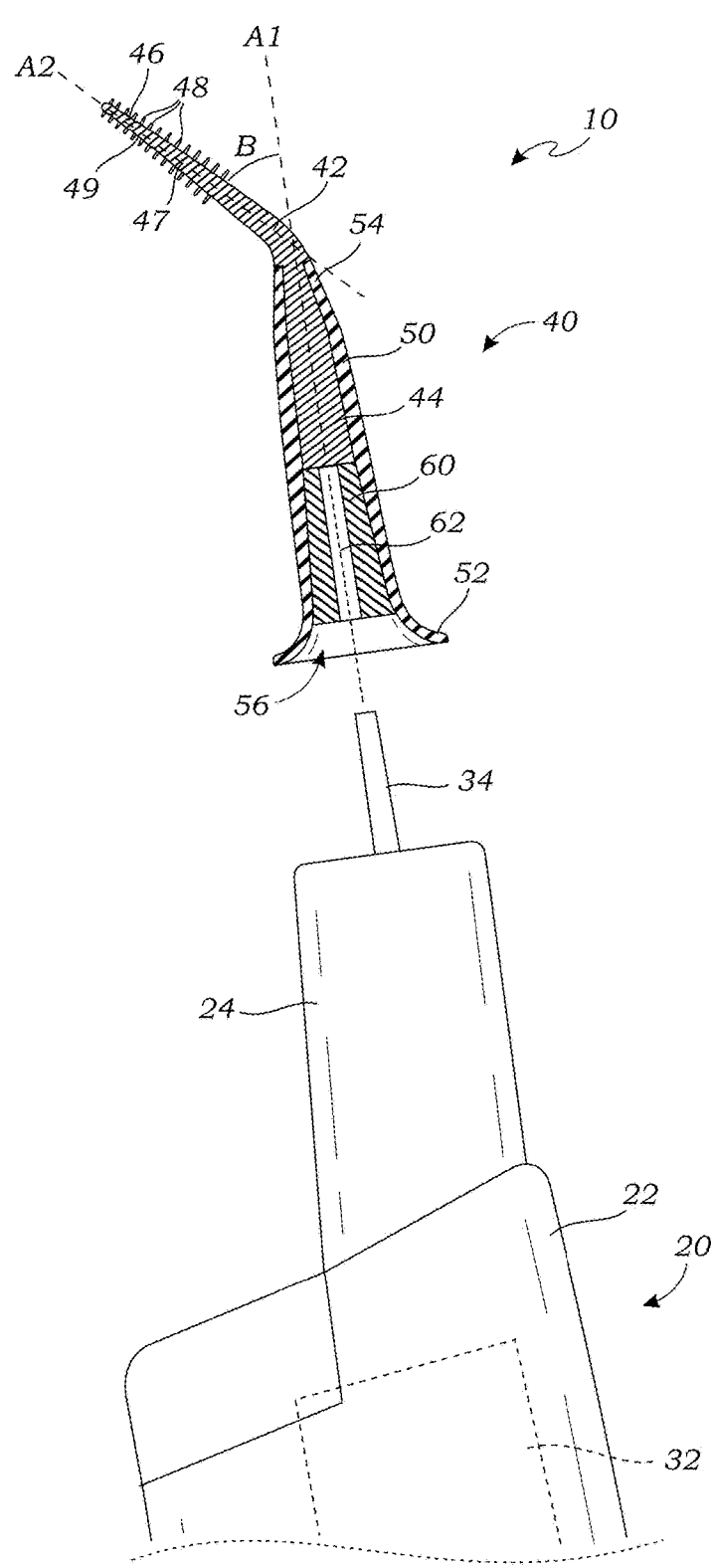
FIG. 1
FIG. 2

METHOD FOR CLEANING TEETH

BACKGROUND OF THE INVENTION

Field of the Invention

This invention relates generally to methods for cleaning teeth, and more particularly to a method for using an interproximal pick device for cleaning the interproximal spaces between a user's teeth, and in the gingival sulcus between a person's teeth and gums.

Description of Related Art

It is important to prevent accumulation of plaque, biofilm, and bacterial colonies in interproximal spaces between a person's teeth, and in the gingival sulcus between a person's teeth and gums. Such accumulations can create pockets of low pH which can cause gingival inflammation, enamel demineralization, and periodontal disease.

The prior art teaches sonic toothbrushes for cleaning the outer surfaces of teeth, but are not effective in cleaning interproximal spaces between a user's teeth, and in the gingival sulcus between a person's teeth and gums.

The prior art also teaches interproximal cleaning and flossing devices, some of which use sonic or ultrasonic vibration to enhance the effectiveness of the device, but none of which have the advantages achieved by the present invention. Some examples include the following:

O'Beirne, U.S. Pat. No. 11,173,018, teaches an oral hygiene device that includes a handle portion and a head portion coupled to the handle portion via a pick head interface. A pick head may be removably coupled to the pick head interface. The pick head may include a pointed pick member. A vibration element may be coupled to the pick head interface. The vibration element may be effective to vibrate the pick head. The pick head includes a "pointed pick member" that includes a core an and outer region surrounding the core.

Mao, U.S. 2016/0135657, teaches a porous tooth cleaning device that is suitable for flossing.

Phan, U.S. 2020/0086355, teaches a device for cleaning interproximal spaces between teeth. The device includes a coupling body having a coupling portion for removably coupling with a handle apparatus. An interproximal member extends from the handle apparatus. Energy is transferred from the handle apparatus to the interproximal member. The interproximal member has a profile for fitting within and cleaning an interproximal area.

Pond, U.S. Pat. No. 10,098,708, teaches an ultrasonic dental handpiece that includes an ultrasonic insert which provides vibrations to a standard dental scaler tip, which are typically made of stainless (304) steel. These ultrasonic steel tools are only suitable for professional use, as they can cause pain and harm if used incorrectly.

Swatton, U.S. Pat. No. 10,368,967, teaches a similar steel tip mounted on a dental insert which has a nozzle supporting a grip sleeve.

Dao, U.S. Pat. No. 5,749,727, teaches a sonic subgingival tool for contacting subgingival tooth surfaces via an activated tip. Vibrations are conducted to the tip via a connecting body.

The prior art teaches interproximal cleaning and flossing devices, some of which use sonic or ultrasonic vibration to enhance the effectiveness of the device. However, the prior art does not teach an interproximal pick device having the improved construction of the present invention. The present invention fulfills these needs and provides further advantages as described in the following summary.

SUMMARY OF THE INVENTION

The present invention teaches certain benefits in construction and use which give rise to the objectives described below.

The present invention provides a method of cleaning teeth comprising the steps of providing a vibration generating handle that includes a handle body that houses a vibration generator, and a mounting post operatively connected to the vibration generator; and providing an interproximal pick device that is adapted for use with the vibration generating handle. The interproximal pick device includes an elongate resilient pick that extends from a proximal end to a distal end, the distal end being sized and shaped for cleaning between the teeth; a rigid tubular housing that extends from a top end to a bottom end and defines an inner conduit; wherein the proximal end of the elongate resilient pick is fixedly secured within the inner conduit adjacent the top end; and a resilient tube positioned within the inner conduit adjacent the bottom end. The interproximal pick device is mounted on the mounting post of the vibration generating handle such that the mounting post frictionally engages the resilient tube.

A primary objective of the present invention is to provide a method for cleaning teeth having advantages not taught by the prior art.

Another objective is to provide a method for cleaning teeth using an interproximal pick device that can be readily mounted on a sonic vibration generating handle for use in cleaning between teeth.

A further objective is to provide method for cleaning teeth that is effective in removing plaque, biofilm, and bacterial colonies in interproximal spaces between a person's teeth, and in the gingival sulcus between a person's teeth and gums.

A further objective is to provide a method for cleaning teeth using an interproximal pick device that can determine and report the pH between the user's teeth, for determining if there is an increased risk of cavities, gingivitis, and other forms of periodontal disease.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the present invention.

FIG. 1 is a perspective view of a sonic dental cleaning system that includes an interproximal pick device mounted on a sonic vibration generating handle, according to one embodiment of the present invention.

FIG. 2 is an exploded side elevation view of the sonic dental cleaning system, illustrating the interproximal pick device in cross-section to show its internal construction.

DETAILED DESCRIPTION OF THE INVENTION

Figure 3:
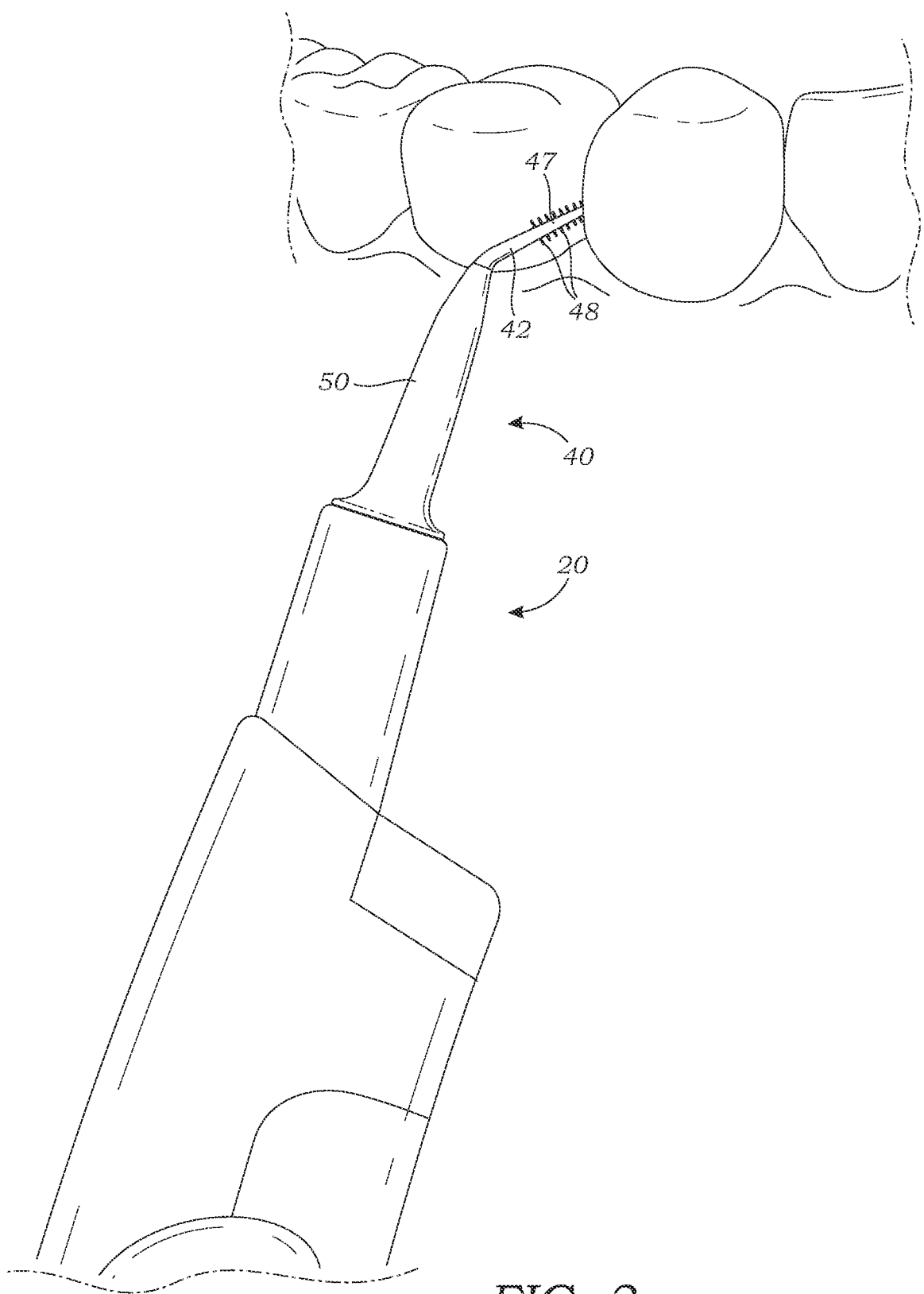
FIG. 3 is a close-up perspective view of the interproximal pick device being used to clean between two teeth.

The above-described drawing figures illustrate the invention, a method for cleaning teeth using an sonic dental cleaning system 10 that includes an interproximal pick device 40 adapted for use with a sonic vibration generating handle 20. The method provides for sonic cleaning between a user's teeth and for cleaning in subgingival spaces between the teeth and gums.

FIG. 1 is a perspective view of one embodiment of the sonic dental cleaning system 10 illustrating the interproximal pick device 40 mounted on the sonic vibration generating handle 20, according to one embodiment of the present invention. As shown in FIG. 1, the sonic vibration generating handle 20 has a handle body 22 that in in this embodiment is an elongate tubular structure that extends from a proximal end 24 to a distal end 26. The handle body 22 is constructed to be easy to grasp for use, and is sized and shaped to fit easily into a user's hand. The handle body 22 may be constructed of plastic, or any other suitable material known in the art for such devices.

The interproximal pick device 40 mounts on the proximal end 24 of the sonic vibration generating handle 20 where it is operatively positioned to be inserted into a user's mouth, as discussed below. The handle body 22 encloses a space for housing and protecting a power source 28 (e.g., a battery, or a power cord adapted to be plugged into an AC outlet, or any other power source known to those skilled in the art) operatively connected through a switch 30 to a sonic vibration generator 32 capable of generating vibrations that are suitable for cleaning teeth. In one embodiment, the vibration generator generates sonic vibrations at a frequency of between 20-20,000 Hz. In other embodiments, other frequencies may be used, so long as they are effective in cleaning teeth, and are not damaging to the teeth or gums of the user.

FIG. 2 is an exploded side elevation view of the sonic dental cleaning system 10, illustrating the interproximal pick device 40 in cross-section to show its internal construction. As shown in FIG. 2, the handle body 22 includes a mounting post 34 operatively connected to the sonic vibration generator 32. The interproximal pick device 40 is mounted upon the mounting post 34 so that vibrations are transmitted into the interproximal pick device 40.

As shown in FIG. 2, the interproximal pick device 40 comprises an elongate resilient pick 42 that extends from a proximal end 44 to a distal end 46. The distal end 46 is sized and shaped for cleaning between the teeth. The distal end 46 may include a bristled portion 47 that includes a plurality of bristles 48 for facilitating the cleaning effectiveness of the pick device 40. The bristled portion 47 may be formed of rubber or silicone or other suitable material suited for cleaning teeth. The bristled portion 47 preferably extends about 15 mm in length, but this length may be varied depending upon the preferences of a product designer skilled in the art.

The distal end 46 may further include a pH indicator coating 49 covering at least a portion of the distal end 46 of the elongate resilient pick 40. The pH indicator coating 49 comprises chemicals which turn a predetermined color indicative of the pH of the user's teeth, thereby indicating whether cleaning is being performed effectively, or whether the user should take additional cleaning steps.

As shown in FIG. 2, the interproximal pick device 40 further includes a rigid tubular housing 50 that is disposed on an axis A1. The proximal end 44 of the elongate resilient pick extends 42 is mounted within the rigid tubular housing 50, and the distal end 46 extends outwardly on a second axis A2 that is at an angle B to the axis A1. The angle B is between 10-50 degrees, preferably about 30 degrees.

The rigid tubular housing extends 50 from a top end 54 to a bottom end 52 and defines an inner conduit 56. The proximal end 44 of the elongate resilient pick 42 is fixedly secured within the inner conduit 56 adjacent the top end 54. A resilient tube 60 is positioned within the inner conduit 56 adjacent the bottom end 52, the resilient tube 60 being sized and shaped to form an inner receiver conduit 62 adapted to receive the mounting post 34 of the sonic vibration generating handle 20, such that sonic vibrations from the mounting post 34 are transmitted through the resilient tube 60, through the rigid tubular housing 50, and into the elongate resilient pick 42, for cleaning between the teeth. In the current embodiment, the rigid tubular housing 50 is plastic or some other suitably rigid material, and the resilient inner tube 60 is rubber or silicone, or some other suitably pliable material that is suitable for receiving and frictionally engaging the mounting post 34.

FIG. 3 is a close-up perspective view of the interproximal pick device 40 being used to clean between two teeth. As shown in FIG. 3, the bristled portion 47 is sized and shaped to fit between the teeth or otherwise used to clean the teeth as described above. The bristles 48 can assist in removing plaque, biofilm, and bacterial colonies in interproximal spaces between a person's teeth, and in the gingival sulcus between a person's teeth and gums.

Furthermore, the pH indicator coating 49 may be used to determine and report the pH between the user's teeth, for determining if there is an increased risk of cavities, gingivitis, and other forms of periodontal disease. The interproximal pick device 40 is inserted between the user's teeth (in this embodiment, the bristled portion 47) so that the pH indicator coating 49 is exposed an environment adjacent the user's teeth and turns color to indicate the pH adjacent the user's teeth. If the pH indicator coating 49 indicates a low (acidic) pH, this may prompt the user to be more diligent in his or her cleaning efforts. It may also provide a warning of potential dental problems, so he or she may decide to see a dentist for a cleaning and a check for cavities and other problems. If the pH indicator coating 49 shows a healthy pH, the user can be confident that the cleaning system 10 is performing effectively.

The title of the present application, and the claims presented, do not limit what may be claimed in the future, based upon and supported by the present application. Furthermore, any features shown in any of the drawings may be combined with any features from any other drawings to form an invention which may be claimed.

As used in this application, the words "a," "an," and "one" are defined to include one or more of the referenced item unless specifically stated otherwise. The terms "approximately" and "about" are defined to mean+/−10%, unless otherwise stated. Also, the terms "have," "include," "contain," and similar terms are defined to mean "comprising" unless specifically stated otherwise.

Furthermore, the terminology used in the specification provided above is hereby defined to include similar and/or equivalent terms, and/or alternative embodiments that would be considered obvious to one skilled in the art given the teachings of the present patent application. While the invention has been described with reference to at least one particular embodiment, it is to be clearly understood that the invention is not limited to these embodiments, but rather the scope of the invention is defined by claims made to the invention.

What is claimed is:

1. A method of cleaning teeth comprising the steps of:
providing a vibration generating handle that includes a handle body that houses a vibration generator, and a mounting post operatively connected to the vibration generator;
providing an interproximal pick device comprising:
an elongate resilient pick that extends from a proximal end to a distal end, the distal end being sized and shaped for cleaning between the teeth;
a rigid tubular housing that extends from a distal end to a bottom proximal end and defines an inner conduit therebetween, the inner conduit having an inner diameter, wherein the inner diameter at the distal end of the rigid tubular housing is smaller than at a central portion of the rigid tubular housing;
wherein the proximal end and a central portion of the elongate resilient pick is are fixedly secured within the inner conduit such that an outer surface of the elongate resilient pick is in contact with an inner surface of the rigid tubular housing and the central portion of the resilient pick defines a shoulder which extends over a distal-most surface of the distal end of the rigid tubular housing adjacent the top end thereby holding the elongate resilient pick within the rigid tubular housing; and
a resilient tube positioned within the proximal end of the inner conduit, the resilient tube being sized and shaped to receive the mounting post, such that vibrations are transmissible through the resilient tube, through the rigid tubular housing, and into the elongate resilient pick, for cleaning between the teeth;
mounting the interproximal pick device on the mounting post of the vibration generating handle such that the mounting post frictionally engages the resilient tube;
inserting the distal end of the interproximal pick between a user's teeth and/or between teeth and gums to clean therebetween.

2. The method of claim 1, further comprising the step of actuating a switch of the vibration generating handle, such that vibrations from the mounting post are transmitted through the resilient tube, through the rigid tubular housing, and into the elongate resilient pick, for cleaning between the teeth.

3. The method of claim 1, wherein the rigid tubular housing is disposed on an axis, and the elongate resilient pick extends outwardly from the rigid tubular housing at an angle to the axis that is between 10-50 degrees.

4. The method of claim 1, wherein the rigid tubular housing is disposed on an axis, and the elongate resilient pick extends outwardly from the rigid tubular housing at an angle to the axis that is about 30 degrees.

5. The method of claim 1, wherein the rigid tubular housing is plastic and the resilient inner tube is rubber or silicone.

6. The method of claim 1, wherein the interproximal pick device further comprises a pH indicator coating covering at least a portion of the distal end of the elongate resilient pick; and further comprising the step of inserting the interproximal pick device between the user's teeth so that the pH indicator coating is exposed to an environment adjacent the user's teeth and turns color to indicate the pH adjacent the user's teeth.

7. The method of claim 1, wherein the distal end of the elongate resilient pick includes a bristled portion that is rubber or silicone and extends about 15 mm in length.

8. The method of claim 1, wherein the vibration generator generates sonic vibrations at a frequency of between 20-20,000 Hz.

* * * * *